(12) United States Patent
Thomson et al.

(10) Patent No.: US 8,289,210 B2
(45) Date of Patent: Oct. 16, 2012

(54) LOCATION MEASUREMENT ACQUISITION ADAPTIVE OPTIMIZATION

(75) Inventors: Martin Thomson, Keiraville (AU); James Winterbottom, Gwynneville (AU)

(73) Assignee: Andrew LLC, Hickory, NC (US)

( * ) Notice: Subject to any disclaimer, the term of this patent is extended or adjusted under 35 U.S.C. 154(b) by 238 days.

(21) Appl. No.: 12/580,043

(22) Filed: Oct. 15, 2009

(65) Prior Publication Data

US 2011/0090122 A1     Apr. 21, 2011

(51) Int. Cl.
 *G01S 3/02*     (2006.01)
(52) U.S. Cl. ....................................................... 342/451
(58) Field of Classification Search .................... 342/451
See application file for complete search history.

(56) References Cited

U.S. PATENT DOCUMENTS

| | | |
|---|---|---|
| 3,150,372 A | 9/1964 | Groth, Jr. |
| 3,659,085 A | 4/1972 | Potter et al. |
| 4,728,959 A | 3/1988 | Maloney |
| 4,814,751 A | 3/1989 | Hawkins |
| 4,845,504 A | 7/1989 | Roberts et al. |
| 4,891,650 A | 1/1990 | Sheffer |
| 5,056,106 A | 10/1991 | Wang |
| 5,218,618 A | 6/1993 | Sagey |
| 5,317,323 A | 5/1994 | Kennedy et al. |
| 5,327,144 A | 7/1994 | Stilp et al. |
| 5,365,544 A | 11/1994 | Schilling |
| 5,372,144 A | 12/1994 | Mortier et al. |
| 5,404,376 A | 4/1995 | Dent |
| 5,423,067 A | 6/1995 | Manabe |
| 5,465,289 A | 11/1995 | Kennedy |
| 5,506,863 A | 4/1996 | Meidan et al. |
| 5,506,864 A | 4/1996 | Schilling |
| 5,508,708 A | 4/1996 | Ghosh et al. |
| 5,512,908 A | 4/1996 | Herrick |
| 5,515,419 A | 5/1996 | Sheffer |
| 5,519,760 A | 5/1996 | Borkowski et al. |
| 5,559,864 A | 9/1996 | Kennedy |
| 5,592,180 A | 1/1997 | Yokev et al. |
| 5,608,410 A | 3/1997 | Stilp et al. |
| 5,614,914 A | 3/1997 | Bolgiano et al. |
| 5,675,344 A | 10/1997 | Tong et al. |
| 5,736,964 A | 4/1998 | Ghosh et al. |

(Continued)

FOREIGN PATENT DOCUMENTS

JP           06-347529        12/1994

(Continued)

OTHER PUBLICATIONS

Y. Zhao, "Standardization of Mobile Phone Positioning for 3G Systems," IEEE Communications Magazine, Jul. 2002, pp. 108-116.

(Continued)

*Primary Examiner* — Harry Liu
(74) *Attorney, Agent, or Firm* — Duane Morris LLP (57) ABSTRACT

A disclosed method uses the results of location queries to tune the value of measurements of a property to obtain a statistically representative measurement for geo location. As location requests arrive, a current measurement value associated with the serving area or location is used to determine the number of measurements to obtained; the resulting uncertainty is mapped against the number of measurements required to determine that value. If additional measurements are required to achieve the target uncertainty in the result, this is recorded. The process relies on empirical observations and has the additional advantage of being blind to the actual network topology. This approach by its own nature automatically takes into account network changes whether known or unknown.

16 Claims, 9 Drawing Sheets

U.S. PATENT DOCUMENTS

| | | | |
|---|---|---|---|
| 5,815,538 A | 9/1998 | Grell et al. | |
| 5,825,887 A | 10/1998 | Lennen | |
| 5,870,029 A | 2/1999 | Otto et al. | |
| 5,920,278 A | 7/1999 | Tyler et al. | |
| 5,952,969 A | 9/1999 | Hagerman et al. | |
| 5,959,580 A | 9/1999 | Maloney et al. | |
| 5,960,341 A | 9/1999 | LeBlanc et al. | |
| 5,973,643 A | 10/1999 | Hawkes et al. | |
| 5,987,329 A | 11/1999 | Yost | |
| 6,014,102 A | 1/2000 | Mitzlaff et al. | |
| 6,047,192 A | 4/2000 | Maloney | |
| 6,091,362 A | 7/2000 | Stilp | |
| 6,097,336 A | 8/2000 | Stilp | |
| 6,097,959 A | 8/2000 | Yost | |
| 6,101,178 A | 8/2000 | Beal | |
| 6,108,555 A | 8/2000 | Maloney et al. | |
| 6,115,599 A | 9/2000 | Stilp | |
| 6,119,013 A | 9/2000 | Maloney et al. | |
| 6,127,975 A | 10/2000 | Maloney | |
| 6,144,711 A | 11/2000 | Raleigh et al. | |
| 6,172,644 B1 | 1/2001 | Stilp | |
| 6,184,829 B1 | 2/2001 | Stilp | |
| 6,188,351 B1 | 2/2001 | Bloebaum | |
| 6,191,738 B1 | 2/2001 | Pfeil et al. | |
| 6,201,499 B1 | 3/2001 | Hawkes et al. | |
| 6,201,803 B1 | 3/2001 | Munday et al. | |
| 6,212,319 B1 | 4/2001 | Cayrefourcq | |
| 6,233,459 B1 | 5/2001 | Sullivan et al. | |
| 6,246,884 B1 | 6/2001 | Karmi et al. | |
| 6,266,013 B1 | 7/2001 | Stilp et al. | |
| 6,281,834 B1 | 8/2001 | Stilp | |
| 6,285,321 B1 | 9/2001 | Stilp et al. | |
| 6,288,675 B1 | 9/2001 | Maloney | |
| 6,288,676 B1 | 9/2001 | Maloney | |
| 6,295,455 B1 | 9/2001 | Fischer et al. | |
| 6,311,043 B1 | 10/2001 | Haardt et al. | |
| 6,317,081 B1 | 11/2001 | Stilp | |
| 6,317,604 B1 | 11/2001 | Kovach, Jr. et al. | |
| 6,334,059 B1 | 12/2001 | Stilp et al. | |
| 6,351,235 B1 | 2/2002 | Stilp | |
| 6,366,241 B2 | 4/2002 | Pack | |
| 6,388,618 B1 | 5/2002 | Stilp et al. | |
| 6,400,320 B1 | 6/2002 | Stilp et al. | |
| 6,407,703 B1 | 6/2002 | Minter et al. | |
| 6,463,290 B1 | 10/2002 | Stilp et al. | |
| 6,470,195 B1 | 10/2002 | Meyer | |
| 6,477,161 B1 | 11/2002 | Hudson | |
| 6,483,460 B2 | 11/2002 | Stilp et al. | |
| 6,492,944 B1 | 12/2002 | Stilp | |
| 6,501,955 B1 | 12/2002 | Durrant | |
| 6,519,465 B2 | 2/2003 | Stilp et al. | |
| 6,546,256 B1 | 4/2003 | Maloney et al. | |
| 6,553,322 B1 | 4/2003 | Ignagni | |
| 6,563,460 B2 | 5/2003 | Stilp et al. | |
| 6,571,082 B1 | 5/2003 | Rahman | |
| 6,603,428 B2 | 8/2003 | Stilp | |
| 6,603,761 B1 | 8/2003 | Wang | |
| 6,640,106 B2 | 10/2003 | Gutowski et al. | |
| 6,646,604 B2 | 11/2003 | Anderson | |
| 6,661,379 B2 | 12/2003 | Stilp et al. | |
| 6,765,531 B2 | 7/2004 | Anderson | |
| 6,771,625 B1 | 8/2004 | Beal | |
| 6,771,969 B1 | 8/2004 | Chinoy | |
| 6,782,264 B2 | 8/2004 | Anderson | |
| 6,834,234 B2 | 12/2004 | Scherzinger et al. | |
| 6,839,539 B2 | 1/2005 | Durrant et al. | |
| 6,845,240 B2 | 1/2005 | Carlson et al. | |
| 6,859,172 B2 | 2/2005 | Powers et al. | |
| 6,871,077 B2 | 3/2005 | Kennedy, Jr. | |
| 6,873,290 B2 | 3/2005 | Anderson et al. | |
| 6,876,859 B2 | 4/2005 | Anderson et al. | |
| 6,920,329 B2 | 7/2005 | Kennedy, Jr. et al. | |
| 6,922,170 B2 | 7/2005 | Alexander, Jr. | |
| 6,937,969 B1* | 8/2005 | Vandersteen et al. | 703/14 |
| 6,952,158 B2 | 10/2005 | Kennedy, Jr. | |
| 6,987,979 B2 | 1/2006 | Carlsson | |
| 6,996,392 B2 | 2/2006 | Anderson et al. | |
| 7,023,383 B2 | 4/2006 | Stilp et al. | |
| 7,167,713 B2 | 1/2007 | Anderson | |
| 7,271,765 B2 | 9/2007 | Stilp et al. | |
| 7,340,259 B2 | 3/2008 | Maloney et al. | |
| 7,427,952 B2 | 9/2008 | Bull et al. | |
| 7,440,762 B2 | 10/2008 | Maloney et al. | |
| 7,593,738 B2 | 9/2009 | Anderson | |
| 2002/0172223 A1 | 11/2002 | Stilp | |
| 2003/0064734 A1 | 4/2003 | Stilp et al. | |
| 2003/0139188 A1 | 7/2003 | Chen et al. | |
| 2003/0190919 A1 | 10/2003 | Niemenmaa | |
| 2003/0203738 A1 | 10/2003 | Brown et al. | |
| 2004/0043775 A1 | 3/2004 | Kennedy, Jr. et al. | |
| 2004/0132466 A1 | 7/2004 | Kennedy, Jr. et al. | |
| 2004/0203921 A1 | 10/2004 | Bromhead et al. | |
| 2004/0218664 A1 | 11/2004 | Kennedy, Jr. et al. | |
| 2004/0252752 A1 | 12/2004 | Kennedy, Jr. et al. | |
| 2005/0058182 A1 | 3/2005 | Kennedy, Jr. et al. | |
| 2005/0107953 A1* | 5/2005 | Sugla | 701/300 |
| 2005/0136945 A1 | 6/2005 | Kennedy, Jr. et al. | |
| 2005/0164712 A1 | 7/2005 | Kennedy, Jr. et al. | |
| 2005/0192026 A1 | 9/2005 | Carlson et al. | |
| 2006/0003695 A1 | 1/2006 | Kennedy, Jr. et al. | |
| 2006/0003775 A1 | 1/2006 | Bull et al. | |
| 2006/0030333 A1 | 2/2006 | Ward et al. | |
| 2006/0116130 A1 | 6/2006 | Kennedy, Jr. et al. | |
| 2006/0125695 A1 | 6/2006 | Kennedy, Jr. et al. | |
| 2006/0141998 A1 | 6/2006 | Kennedy, Jr. et al. | |
| 2006/0154607 A1 | 7/2006 | Kennedy, Jr. et al. | |
| 2006/0240836 A1 | 10/2006 | Kennedy, Jr. et al. | |
| 2007/0087689 A1 | 4/2007 | Kennedy, Jr. et al. | |
| 2007/0111746 A1 | 5/2007 | Anderson | |
| 2007/0155401 A1 | 7/2007 | Ward et al. | |
| 2007/0155489 A1 | 7/2007 | Beckley et al. | |
| 2007/0202885 A1 | 8/2007 | Kennedy, Jr. et al. | |
| 2008/0132244 A1 | 6/2008 | Anderson | |
| 2008/0132247 A1 | 6/2008 | Anderson | |
| 2008/0137524 A1 | 6/2008 | Anderson et al. | |
| 2008/0158059 A1 | 7/2008 | Bull et al. | |
| 2008/0160952 A1 | 7/2008 | Bull et al. | |
| 2008/0160953 A1 | 7/2008 | Mia et al. | |
| 2008/0161015 A1 | 7/2008 | Maloney et al. | |
| 2008/0248811 A1 | 10/2008 | Maloney et al. | |
| 2008/0261611 A1 | 10/2008 | Mia et al. | |
| 2008/0261612 A1 | 10/2008 | Mia et al. | |
| 2008/0261613 A1 | 10/2008 | Anderson et al. | |
| 2008/0261614 A1 | 10/2008 | Mia et al. | |
| 2009/0005061 A1 | 1/2009 | Ward et al. | |
| 2011/0065453 A1* | 3/2011 | Baldemair et al. | 455/456.1 |

FOREIGN PATENT DOCUMENTS

WO  2006088472 A1  8/2006

OTHER PUBLICATIONS

C. Drane, M. MacNaughtan, and C. Scott, "Positioning GSM Telephones," IEEE Communications Magazine, Apr. 1998, pp. 46-54, 59.

J. Caffery, Jr., and G. Stuber, "Overview of Radiolocation in CDMA Cellular Systems," IEEE Communications Magazine, Apr. 1998, pp. 38-45.

T. Rappaport, J.H. Reed and B.D. Woerner, "Position Location Using Wireless Communications on Highways of the Future," IEEE Communications Magazine, Oct. 1996, pp. 33-41.

I. Ziskind and M. Wax, "Maximum Likelihood Localization of Multiple Sources by Alternating Projection," IEEE Transactions on Acoustics, Speech, and Signal Porcessing, vol. 36, No. 10, pp. 1553-1560, Oct. 1988.

G.W.K. Colman, "A Comparison of the Accuracy of TDOA and TOA Location Algorithms with Equivalent Receiver Geometry," Defence R&D Canada Technical Memorandum (DREO TM 2001-063), Oct. 2001, pp. 1-53.

L. Mailaender, "On the Geolocation Bounds for Round-Trip Time-of-Arrival and All Non-Line-of-Sight Channels", EURASIP Journal on Advances in Signal Processing, vol. 2008, pp. 1-10.

N. Agarwal, L. Chaudran-Wadi, and V. Apte, "Capacity Analysis of the GSM Short Message Service", Indian Institute of Technology Bombay, www.cse.iitb.ac.in/~varsha/allpapers/wireless/ncc03cam.pdf, 2004, pp. 1-5.

J.D. Bard, and F.M. Ham, "Time Difference of Arrival Dilution of Precision and Applications," IEEE Transactions on Signal Processing, vol. 47, No. 2, pp. 521-523, Feb. 1999.

K.C. Ho, and W. Xu, "An Accurate Algebraic Solution for Moving Source Location Using TDOA and FDOA Measurements", IEEE Transactions on Signal Processing, vol. 52, No. 9, Sep. 2004, pp. 2453-2463.

C.H. Knapp and G.C. Carter, "The Generalized Correlation Method for Estimation of Time Delay," IEEE Transactions on Acoustics, Speech, and Signal Processing, vol. ASSP-24, No. 4, Aug. 1976, pp. 320-327.

M. Rahnema, "Overview of the GSM System and Protocol Architecture," IEEE Communications Magazine, Apr. 1993, pp. 92-100.

S. Stein, "Algorithms for Ambiguity Function Processing," IEEE Transactions on Acoustics, Speech, and Signal Processing, vol. ASSP-29, No. 3, Jun. 1981, pp. 588-599.

M. Vanderveen, C.B. Papadias, and A. Paulraj, "Joint Angle and Delay Estimation (JADE) for Multipath Signals Arriving at an Antenna Array", IEEE Communications Letters, vol. 1, No. 1, Jan. 1997, pp. 12-14.

M. Wax and I. Ziskind, "On Unique Localization of Multiple Sources by Passive Sensor Arrays," IEEE Transactions on Acoustics, Speech, and Signal Processing, vol. 37, No. 7, Jul. 1989, pp. 996-1000.

B. Yang, "Projection Approximation Subspace Tracking," IEEE Transactions on Signal Processing, vol. 43, No. 1, Jan. 1995, pp. 95-107.

Amir Leshem, Mati Wax, "Array Calibration in the Presence of Multipath," IEEE Transactions on Signal Processing, vol. 48, No. 1, pp. 53-59, Jan. 2000.

Xin Wang, Zongxin Wang and Bob O'Dea, "A TOA-Based Location Algorithm Reducing the Errors Due to Non-Line-of-Sight (NLOS) Propagation," IEEE Trans. Vehicular Technology, vol. 52, No. 1, Jan. 2003, pp. 112-116.

M. Vanderveen, C. Papadias, A. Paulraj, "Joint Angle and Delay Estimation (JADE) for Multipath Signals Arriving at an Antenna Array," IEEE Communications Letters, vol. 1, No. 1, Jan. 1997, pp. 12-14.

R. Schmidt, "Multiple Emitter Location and Signal Parameter Estimation," IEEE Transactions on Antennas and Propagation, vol. AP-34, No. 3, Mar. 1986, pp. 276-280.

Y. Chen, M. Zoltowski, "Joint Angle and Delay Estimation for DS-CDMA with Application to Reduced Dimension Space-Time Rake Receivers," Mar. 1999, pp. 2933-2936.

A.J. Paulraj, C.B. Papadias, "Space-Time Processing for Wireless Communications", IEEE Signal Processing Magazine, vol. 11, Nov. 1997, pp. 49-83.

C.B. Papadias, A.J. Paulraj , "Space-Time Signal Processing for Wireless Communications: A Survey", Information Systems Laboratory, Stanford University.

M. Haardt, C. Brunner, J. Nossek, "Joint Estimation of 2-D Arrival Angles, Propagation Delays, and Doppler Frequencies in Wireless Communications," Proc. IEEE Digital Signal Processing Workshop, vol. 1, pp. 1-4, Bryce Canyon National Park, Utah, Aug. 1998.

Mati Wax, "Position Location from Sensors with Position Uncertainty," IEEE Transactions Aerospace and Electronic Systems, vol. AES-19, No. 5, Sep. 1983, pp. 658-662.

D.J. Torrieri, "Statistical Theory of Passive Location Systems", IEEE Transactions Aerospace and Electronic Systems, vol. AES-20, No. 2, Mar. 1984, pp. 183-198.

Y.T. Chan and K.C. Ho, "A Simple and Efficient Estimator for Hyperbolic Location", IEEE Transactions Signal Processing, vol. 42, No. 8, Aug. 1994, pp. 1905-1915.

W.H. Foy, "Position-Location Solutions by Taylor-Series Estimation", IEEE Transactions Aerospace and Electronic Systems, vol. AES-12, No. 2, Mar. 1976, pp. 187-194.

R.G. Stansfield, "Statistical Theory of DF Fixing", Journal IEE 94, Part III A, Oct. 1947, pp. 762-770.

M.P. Wylie and J. Holtzman, "The Non-Line of Sight Problem in Mobile Location Estimation", Process IEEE 5th International Conference on Universal Personal Communications, vol. 2, Oct. 1996, pp. 827-831.

L.Cong and W. Zhuang, "Non-Line-of-Sight Error Mitigation in TDOA Mobile Location", Process IEEE Global Telecommunications Conference, vol. 1, Sep. 2001, pp. 680-684.

P.C. Chen, "A Non-Line-of-Sight Error Mitigation Algorithm in Location Estimation", Process IEEE Conference on Wireless Communications Networking, vol. 1, 1999, pp. 316-320.

N. J. Thomas, D.G.M. Cruickshank and D.I. Laurenson, "Performance of a TDOA-AOA Hybrid Mobile Location System", 3G Mobile Communication Technologies, Conference Publication No. 477, Mar. 2001, pp. 216-220.

J. Caffery, Jr., and G. Stuber, "Subscriber Location in CDMA Cellular Networks," IEEE Transactions on Vehicular Technology, vol. 47, No. 2, May 1998, pp. 406-416.

J. Caffery. Jr., "A New Approach to the Geometry of TOA Location," IEEE, VTC 2000, pp. 1943-1949.

M.Silventoinen and T. Rantalainen, "Mobile Station Emergency Locating in GSM", Process IEEE International Conference, Personal Wireless Communications, vol. 1, 1996, pp. 232-238.

* cited by examiner

LOCATION MEASUREMENT ACQUISITION ADAPTIVE OPTIMIZATION

CROSS REFERENCES

This application is related to and filed concurrently with application entitled "LOCATION MEASUREMENT ACQUISITION OPTIMIZATION WITH MONTE CARLO SIMULATION" filed Oct. 15, 2009, the entirety is hereby incorporated by reference.

BACKGROUND

As is well known in the art, the use of wireless communication devices such as telephones, pagers, personal digital assistants, laptop computers, anti-theft devices, etc., hereinafter referred to collectively as "mobile devices", has become prevalent in today's society. Along with the proliferation of these mobile devices is the safety concern associated with the need to locate the mobile device, for example in an emergency situation. For example, the Federal Communication Commission ("FCC") has issued a geolocation mandate for providers of wireless telephone communication services that puts in place a schedule and an accuracy standard under which the providers of wireless communications must implement geolocation technology for wireless telephones when used to make a 911 emergency telephone call (FCC 94-102 E911). In addition to E911 emergency related issues, there has been increased interest in technology which can determine the geographic position, or "geolocate" a mobile device. For example, wireless telecommunications providers are developing location-enabled services for their subscribers including roadside assistance, turn-by-turn driving directions, concierge services, location-specific billing rates and location-specific advertising.

Currently in the art, there are a number of different ways to geolocate a mobile device. For example, providers of wireless communication services have installed mobile device location capabilities into their networks. In operation, these network overlay location systems take measurements on radio frequency ("RF") transmissions from mobile devices at base station locations surrounding the mobile device and estimate the location of the mobile device with respect to the base stations or other radio transmitter. Because the geographic location of the base stations is known, the determination of the location of the mobile device with respect to the base station permits the geographic location of the mobile device to be determined. The RF measurements of the transmitted signal can include the time of arrival, the angle of arrival, the signal power, or the unique/repeatable radio propagation path (radio fingerprinting) derivable features. In addition, the geolocation systems can also use collateral information, e.g., information other than that derived for the RF measurement to assist in the geolocation of the mobile device, i.e., location of roads, dead-reckoning, topography, map matching, etc.

In a network-based geolocation system, the mobile device to be located is typically identified and radio channel assignments determined by (a) monitoring the control information transmitted on radio channel for telephone calls being placed by the mobile device or on a wireline interface to detect calls of interest, i.e., 911, (b) a location request provided by a non-mobile device source, i.e., an enhanced services provider. Once a mobile device to be located has been identified and radio channel assignments determined, the location determining system is tasked to determine the geolocation of the mobile device and then directed to report the determined position to the requesting entity or enhanced services provider.

Location determination in a wireless network relies on measurement data that is acquired from a number of sources, including radio transmitters and target devices (mobile phones, PDAs, etc). The accuracy of the location determination is not only based on the accuracy of the measurement data, but also the network topology (i.e. the geometry of the base stations and the mobile device).

Some location determination techniques rely on a statistical analysis of measurement data. Multiple measurements are taken and a probability distribution is formed. Providing high quality results can require that multiple measurements of the same value are taken. While an individual measurement might be subject to a high degree of uncertainty, the quality of the result can be improved by increasing the number of measurements.

Measurements that are highly subject to variation are most often subject to such a treatment. For instance, radio signal strength is rarely constant due to atmospheric effects and transmitter fluctuations. Similarly, timing measurements can be subject to variable delay through atmosphere and to varying multipath effects.

The extent to which multiple measurements are necessary varies greatly. For trilateration methods such as time difference of arrival (TDOA) where distances from fixed transmitters are measured, the accuracy required of each measurement is largely based on the geometry of the transmitter in relation to the position of the target device.

Dilution of precision (DOP) is a measure of how the geometry of transmitters affects the potential result. From any given point, DOP values—in three dimensions (geometry dilution of precision, or GDOP) and in two dimensions (horizontal dilution of precision, or HDOP)—can be used to indicate the effect that poor quality measurement data has on the final result.

The computation of DOP involves the geometry from the receiver (or point) to the transmitter, which may be represented as unit vectors from the receiver to radio transmitter i.

$$\frac{(x_i - x)}{R_i}, \frac{(y_i - y)}{R_i}, \text{ and } \frac{(z_i - z)}{R_i}$$

where
$R_i = \sqrt{(x_i-x)^2+(y_i-y)^2+(z_i-z)^2}$ and where x, y, and z denote the position of the receiver (selected point) and $x_i$, $y_i$, and $z_i$ denote the question of radio transmitter i. The matrix A may be formulated as:

$$A = \begin{bmatrix} \frac{(x_1 - x)}{R_1} & \frac{(y_1 - y)}{R_1} & \frac{(z_1 - z)}{R_1} & c \\ \frac{(x_2 - x)}{R_2} & \frac{(y_2 - y)}{R_2} & \frac{(z_2 - z)}{R_2} & c \\ \frac{(x_3 - x)}{R_3} & \frac{(y_3 - y)}{R_3} & \frac{(z_3 - z)}{R_3} & c \\ \frac{(x_4 - x)}{R_4} & \frac{(y_4 - y)}{R_4} & \frac{(z_4 - z)}{R_4} & c \end{bmatrix}$$

The first three elements of each row of A are the components of a unit vector from the receiver to the indicated radio transmitter. The elements in the fourth column are c where c denotes the speed of light. The matrix, Q, may be formulated as $$Q=(A^T A)^{-1}$$

where the weighting matrix, P, has been set to the identity matrix.

The elements of the Q matrix are designated as $$Q = \begin{bmatrix} d_x^2 & d_{xy}^2 & d_{xz}^2 & d_{xt}^2 \\ d_{xy}^2 & d_y^2 & d_{yz}^2 & d_{yt}^2 \\ d_{xz}^2 & d_{yz}^2 & d_z^2 & d_{zt}^2 \\ d_{xt}^2 & d_{yt}^2 & d_{zt}^2 & d_t^2 \end{bmatrix}$$

PDOP, TDOP and GDOP may be given by:

$$PDOP = \sqrt{d_x^2 + d_y^2 + d_z^2},$$

$$TDOP = \sqrt{d_t^2}, \text{ and}$$

$$GDOP = \sqrt{PDOP^2 + TDOP^2}$$

The horizontal dilution of precision, $HDOP = \sqrt{d_x^2 + d_y^2}$, and the vertical dilution of precision, $VDOP = \sqrt{d_z^2}$, are both dependent on the coordinate system used. To correspond to the local horizon plane and the local vertical, x, y, and z should denote positions in either a North, East, Down coordinate system or a South, East, Up coordinate system.

Figure 1:
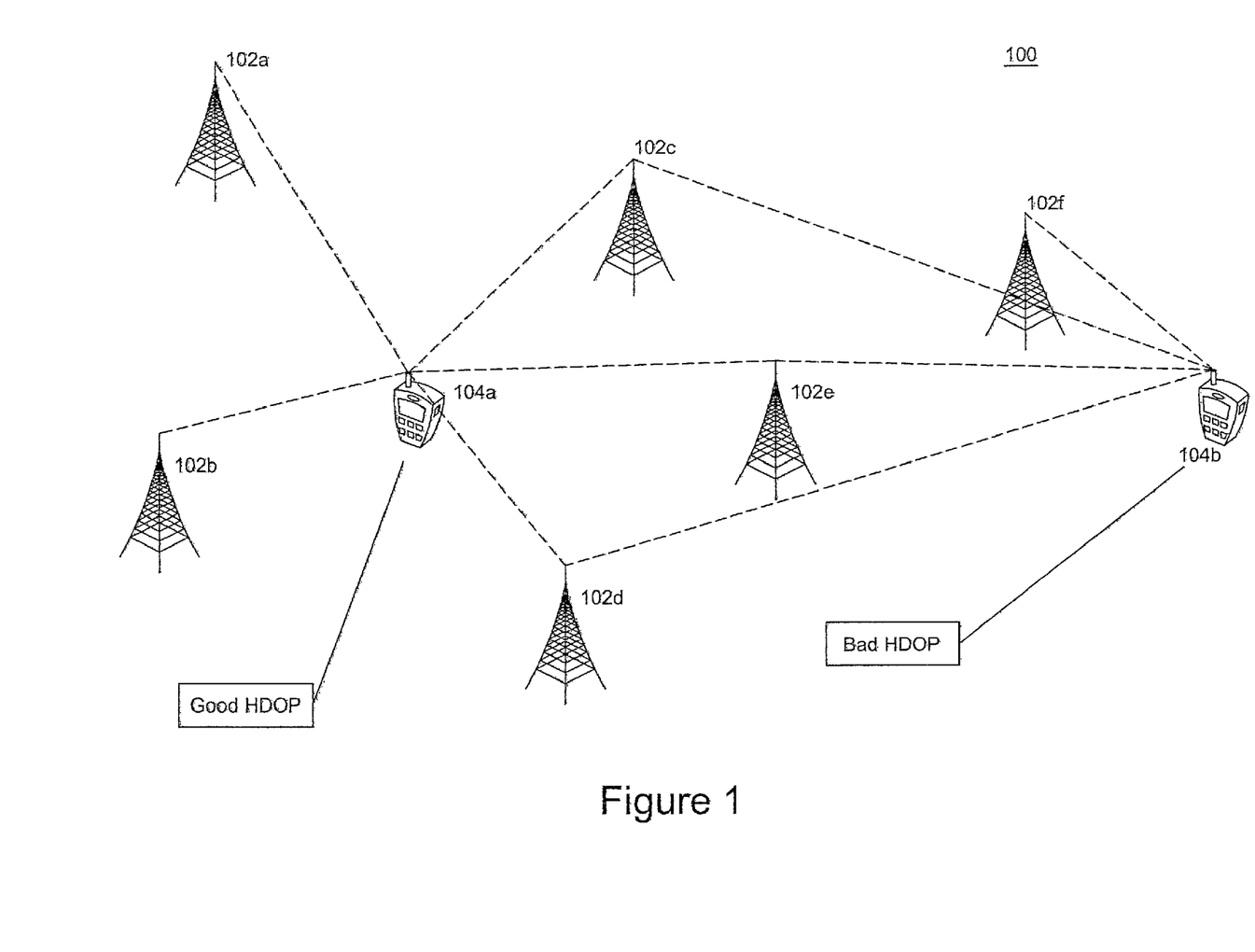
FIG. 1 is an illustration of a network topology and effects on DOP

FIG. 1 illustrates a network topology in which a Comparison of good and bad DOP (HDOP) is demonstrated. The radio transmitters 102a-f are located across the network at known location. A mobile device, such as mobile devices 104a or b may determine their location based on signals received from the radio transmitters 102. Mobile device 104a has a relatively good horizontal dilution of precision in that the vectors between it and each of the radio transmitters are diverse, or more orthogonal to each other. Whereas the DOP of mobile device 104b has a relatively bad HDOP as the vectors to each of the radio transmitters 102 are more similar.

Many trilateration systems use the following simple relationship between horizontal and vertical uncertainty with the corresponding DOP value and the measurement error:

Horizontal Uncertainty (@95% confidence)=2× HDOP×MESD (Measurement error standard deviation)

Vertical Uncertainty (@95% confidence)=2×VDOP× MESD

The measurement error standard deviation (MESD) indicates the degree to which further measurements or calculation show the same or similar results. Therefore, to achieve a particular target uncertainty, measurement error must decrease as DOP increases. The level of uncertainty has an inverse relationship with the confidence level. A high level of uncertainty means a low confidence level and a low level of uncertainty has a high level of confidence. The level of uncertainty may be measured by confidence level. One of the best means of decreasing measurement error is to take more measurements.

The problem is determining how many measurements are needed to produce a result with acceptable quality without excessive cost. Obviously, acquiring multiple measurements takes time and taking measurements also expends limited battery resources in mobile devices. Other operational impacts, such as temporarily silencing radio transmitters can have more wide-ranging impact on the network and its operations as well other network users.

In addition, many networks place the element responsible for location determination at a central location, far remote from the elements that provide measurements. Usually, this is determined by scale: a single high-capacity location server is capable of serving a very large geographic area. However, the distances involved lead to a fixed overhead in measurement acquisition. Network architectures with multiple intermediaries compound the problem. For example, the location determination element in a WiMAX network is far removed from radio transmitters; the large number of intermediaries between the location determination element and the measuring entities introduces significant network delays in communication.

Iterative location determination relies on single measurements, where the measurement process is repeated until the location determination element is able to produce a result of sufficient quality, such as a desired level of uncertainty. However, this method incurs the full cost of the network and measurement overhead for each measurement: initiating a measurement session, network transit delays, and measurement setup (for instance, some radio transmitters might be momentarily disabled to reduce the noise they produce from obscuring measurement of another transmitter).

Determining the optimum number of measurements to acquire ahead of time can provide a significant benefit in efficiently producing a location estimate of the desired quality and in a timely fashion.

The present subject matter in order to obviate the deficiencies of the prior art discloses a novel method for estimating dilution of precision (DOP) across a service area. An embodiment of the method includes selecting points in an area; determining radio transmitters that are capable of being received in the area, calculating a DOP for each the points based on network topology and modeling a DOP function of the service area as a function of the calculated DOP for each of the plurality of points.

The present subject matter also presents a novel method of optimizing the number of measurements requested in an area. An embodiment of the method selects a level of uncertainty; determines a set of radio transmitters capable of being received in the area; and, determines a metric across the area based at least on the geometry of the radio transmitters with respect to randomly distributed points across the area. The method also determines the number of measurements required at a location within the area based on the metric and the selected level of uncertainty.

The present subject matter further presents a novel method for determining the location of a mobile device. An embodiment of the method estimates a first location; retrieves a predetermined network topology metric; and selects a measurement metric using the predetermined topology metric and a predetermined location uncertainty. The embodiment of the method makes first and additional measurements of the property. The additional measurements are predicated on the measurement metric. The embodiment determines the location for the mobile device based at least upon the first measurement and the additional measurements of the property.

The present subject matter additional presents a novel method of adaptively optimizing the amount of measurements of a property required to achieve a desired level of uncertainty in a service area. An embodiment of the method establishes an initial amount (n) of measurements required of a property; when a location request is received, n measurements of the property are obtained; and the location based on the n property measurements is estimated. The embodied method determines the level of uncertainty associated with the estimated location; compares it with at least one threshold which is based on the desired level of uncertainty; and tunes the amount of measurements n based upon the comparison.

The present subject matter presents yet another novel method to locate a mobile device within a predetermined level of uncertainty. An embodiment of the method includes compiling data associated with location requests and location estimates within a service area in a database; associating in the database the amount of plural measurements of a property with the level of uncertainty of a location estimated using the plural measurements. Upon receiving a location request, the method includes determining the level of uncertainty and selecting the amount of plural measurements associated with the level of uncertainty required based on the associations in the database. The embodiment of the method also includes obtaining plural measurements of a property in the amount selected; obtaining a location estimate; determining the level of uncertainty in the location estimate; associating the number of plural measurements obtained and the determined level of uncertainty in the location estimate and compiling the association in the database; and, determining a new amount of measurements required for a desired level of uncertainty.

The present subject matter in addition presents, a novel method of determining a nominal amount of plural measurement of a property required to obtain a predetermined level of uncertainty using actual location requests in a service area subject to property fluctuations. An embodiment of the method includes receiving a location request, estimating a location based on an predetermined level of uncertainty and an amount of property measurements used; associating the amount of measurement samples of a property taken, the estimated location and the resulting level of uncertainty calculated from the estimated location using the measurement samples; and adaptively tuning the associated nominal amount of property measurements based on the estimated location and its level of uncertainty.

The present subject matter presents yet an addition novel method of optimizing the nominal requirements associated with a wireless communications property. An embodiment of the method includes associating location estimates, number of property samples used in the location estimates and level of uncertainties of the location estimates in a historical database; and using the location database to establish nominal requirements. In one embodiment, upon receiving a location request, the method includes generating a location estimate according to the nominal requirements; and then adaptively updating the nominal requirements based on the location estimate.

These and many other objects and advantages of the present invention will be readily apparent to one skilled in the art to which the invention pertains from a perusal or the claims, the appended drawings, and the following detailed description of the preferred embodiments.

DETAILED DESCRIPTION

Monte Carlo Simulation

Location determination in a wireless network usually starts with a coarse location based on the serving area of the base station. For any given serving area, the location determination element can use information about the surrounding network to determine the most likely number of measurements required.

This uses the geometry of the surrounding base stations (radio transmitters) and the likelihood that each can be successfully measured. The DOP can vary for different points within the serving area of the base station, so determining the actual expected value could also differ greatly. To reduce the complexity of this model, a Monte Carlo simulation may be used, taking randomly distributed points within the serving area. This can be used to produce information on the likely distribution of the DOP within the serving area.

Figure 2:
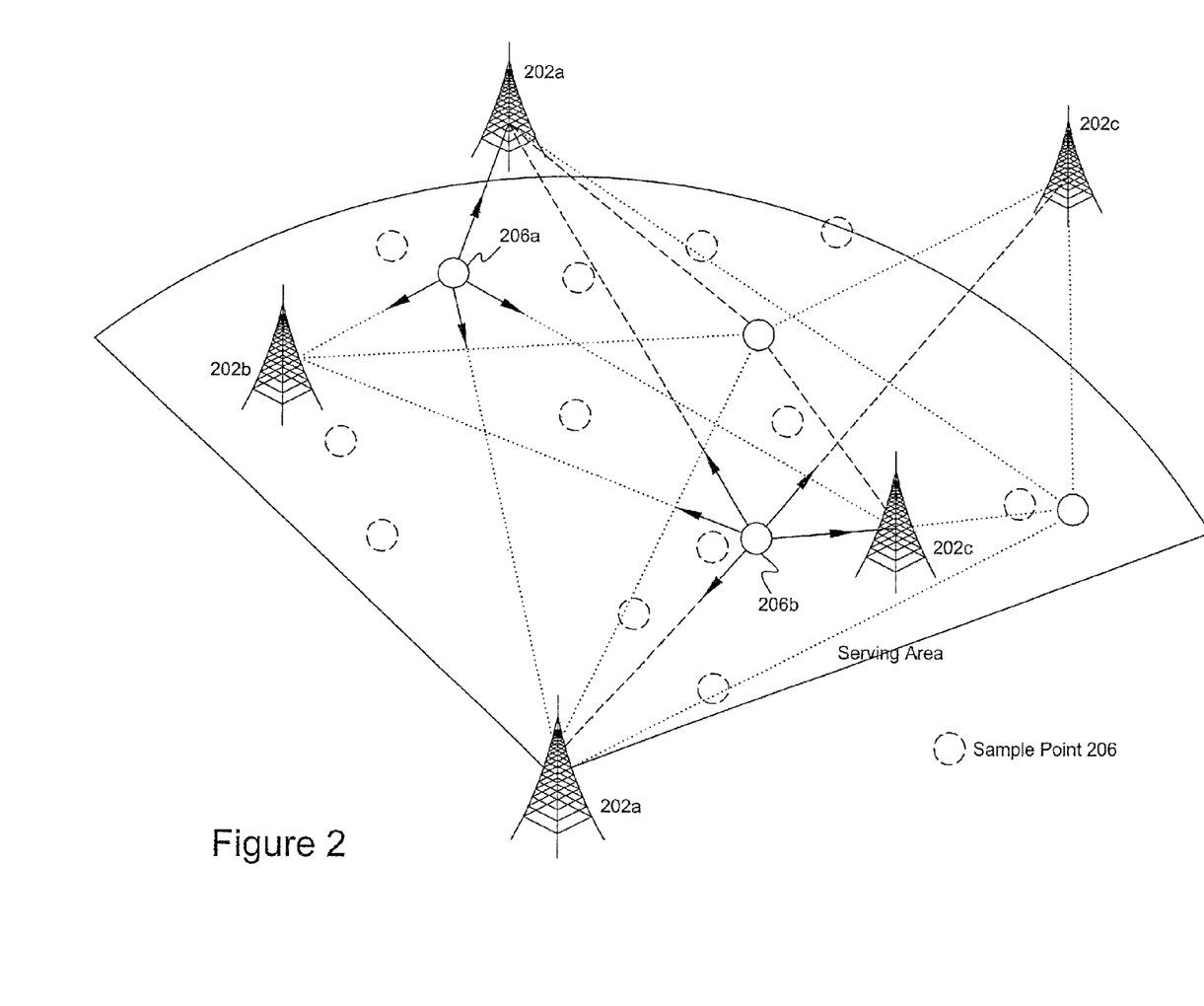
FIG. 2 is a representation of a Monte Carlo simulation

FIG. 2 is a representative example of sample points from a base station serving area, used in a HDOP calculation. The sample points 206 are randomly distributed within serving area or serving sector of based station 203. At each of the sample points the DOP is calculated with respect to each of the base stations or radio transmitters 202 from which a signal may be received and measured. For random point 206 *a*, the DOP is calculated using radio transmitters 202 *a, b, c* and 203. The selection of these radio transmitters may be based on an assigned probability that their signals can be received by a mobile in the area of sample point 206*a*, based on probabilities, the signal from radio transmitter 202 would not be capable of being received at sample point 206*a* and thus not used in the calculation of DOP. In calculating the DOP for random point 206*b* all of the radio transmitters 202*a-d* may be used in the calculation.

Other random factors, such as the probability that nearby base stations can be successfully measured, can also be factored into this as random inputs into the simulation.

This also requires information on the number of measurements needed to produce a given measurement uncertainty. Empirical research or theoretical analysis can be used to produce a table that describes the expected measurement uncertainty based on the number of measurements. This may be used directly, or the results can be entered as another random input into the simulation.

The output of this process is a simple probability, indicating the probable number of measurements required to produce a result of a given quality. Based on a first-pass success probability threshold that might be tuned or configured, an appropriate number is selected and this value is stored with the serving base station identity or serving sector, etc. The stored value is used to determine how many measurements to acquire when servicing a request for location information.

The first-pass success probability threshold trades off the cost of making additional requests for measurements against the wastage cost of taking measurements that are not required. Allowing a lower success rate means that additional requests for measurements are more likely, but measurements are less likely to be acquired when they are not needed. In contrast, aiming for a higher success rate after the first attempt at measurement collection reduces the number of times that a second request is needed, but it increases the cost of all requests due to the additional time and expense required to acquire measurements that might not be needed.

The number (amount) of measurements depends on the target uncertainty required from the result. Therefore, multiple applications of this process might be performed to determine the expected number of measurements for different values of target uncertainty.

This method might be applied to generate an optimum number of measurements based on a small set of target uncertainty values (e.g. 100 m, 200 m or 500 m), or to produce a continuous graph based on a curve fit algorithm.

The advantage of this technique is that while it potentially requires significant processing power (depending on the number of iterations in the Monte Carlo simulation), this processing can be performed ahead of time. Processing need only be performed when network topology changes.

This solution requires that network topology be known ahead of time prior to a location request. Changes to network topology might require re-evaluation of all affected base stations and those nearby. New simulations may also be conducted periodically to capture any change in topology or network operation such as the construction of a new building or an interfering out of network signal.

Figure 3:
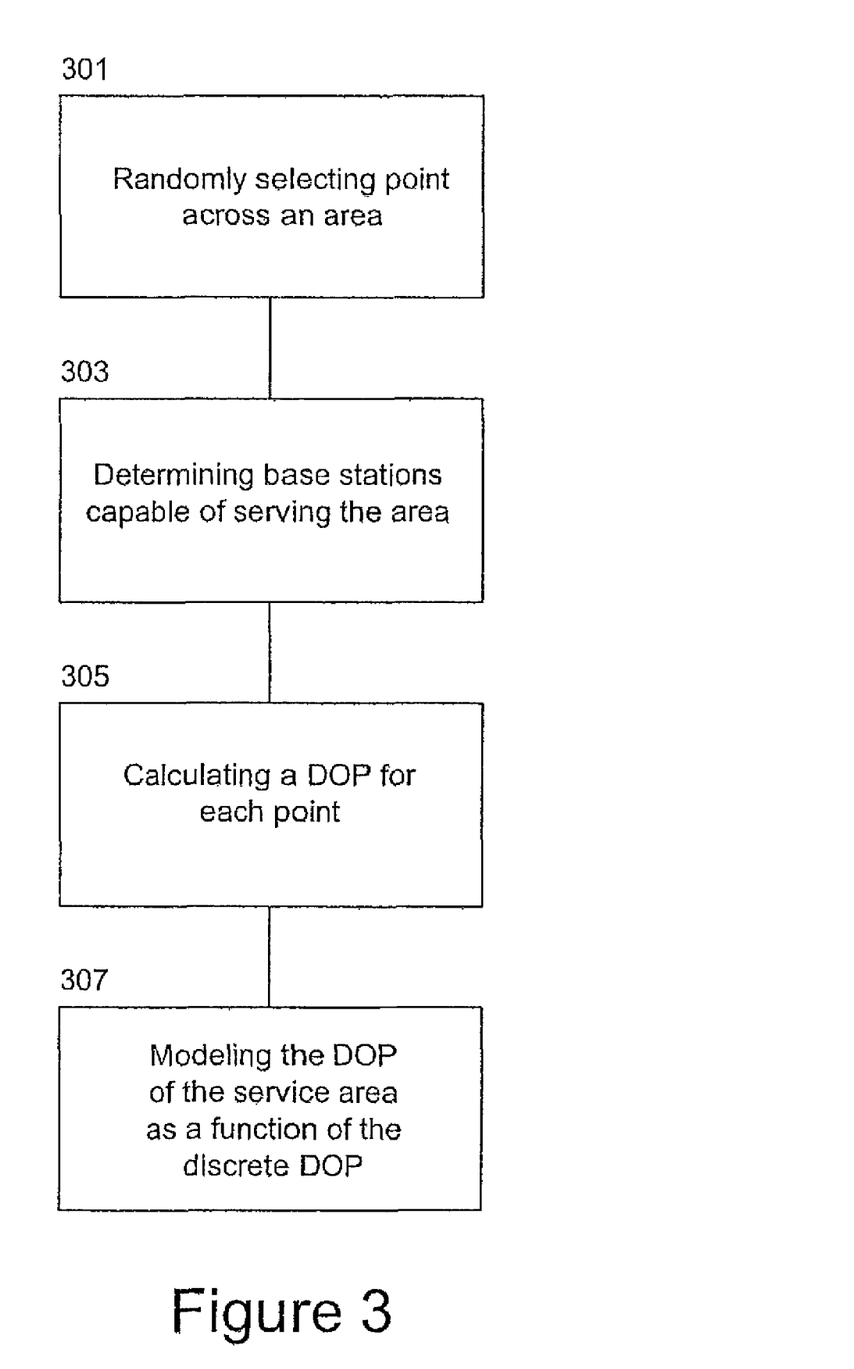
FIG. 3 is a flow chart of an embodiment of the present subject matter utilizing a Monte Carlo simulation.

FIG. 3 illustrates a flow chart for an embodiment for estimating the DOP across a service area utilizing a random distribution of samples, or Monte Carlo simulation. The random samples are selected across an area as shown in Block 301. The area is usually defined by the area served by a base station, or serving sector. The serving area typically is overlapped by other serving areas and signals emanating from other radio transmitters such as base stations, repeaters, beacons, or other transmitters or transceivers. Using signal strength, geography and other known parameters a group of radio transmitters may be identified based on the capability that their signals can be received in the serving area, as shown in Block 303. These radio transmitters' signals are potentially used to determine a location and thus will have an impact of the calculation of the dilution of precision at the random points.

Using the network topology and performance parameter of the radio transmitters, each radio transmitter may be given a probability of receipt. For instance those radio transmitters with high signal strength and located near one of the random points could be given a much larger probability of being received than one located much further away. This probability may be used in determining the set of radio transmitter upon which the DOP will be based or may be used in weighing the contribution to DOP of each of the radio transmitters. The probability related to each radio transmitter and random point combination can be based on historic, simulation or estimated data.

At each of the random points, the geometry with respect to the radio transmitters is determined and a DOP is calculated as shown in Block 305. For instance, in FIG. 2, the radio signals capable of being received are from radio transmitters 202a through 202c and 203 for point 206a, the geometry of these base stations with respect to the random point 206a is used to calculate the DOP.

Performing this calculation for each of the random points creates DOP data across the serving area and a modeling of the DOP for over the entire service area as a function of the discrete DOP data can be made as shown in Block 307. Several methods for modeling are envisioned as being used. Contour maps, functions, interpolations, tables etc. In addition the entire service area may be represented by one DOP value, such as the maximum DOP or the average DOP of a mode of the DOP. A single value for the area may advantageously be used when the Monte Carlo simulation reveals a rather homogenous DOP.

Figure 4:
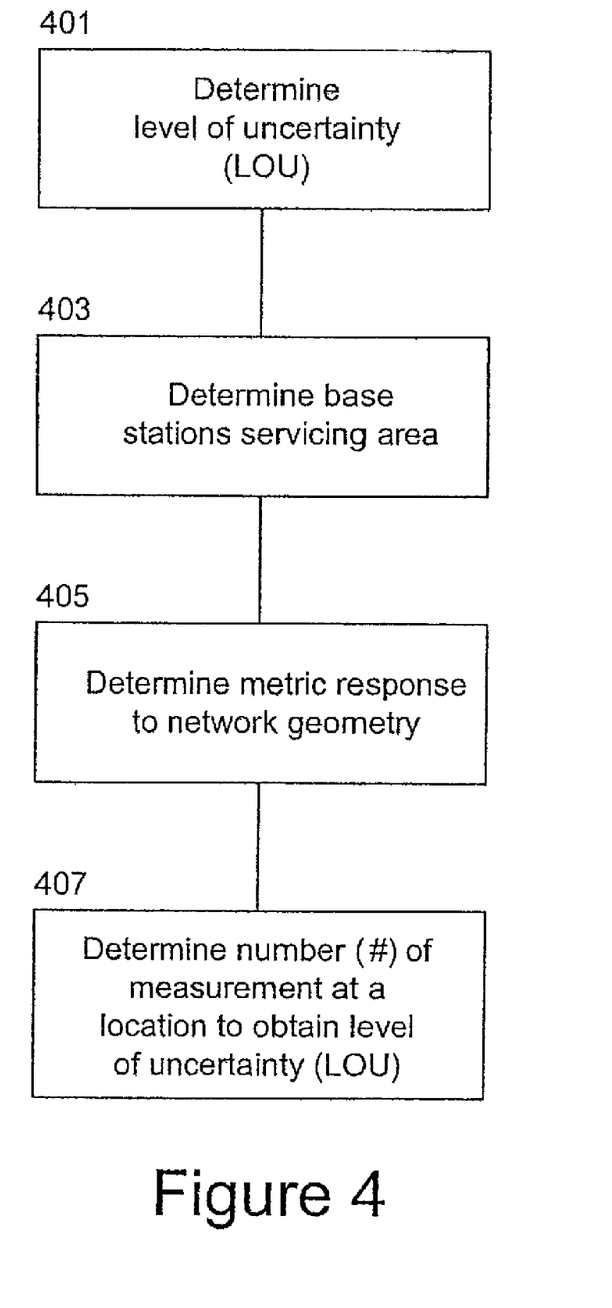
FIG. 4 is a flow chart of another embodiment of the present subject matter utilizing a Monte Carlo simulation.

FIG. 4 represents a method 400 for optimizing the number of measurements required to achieve a desired level of uncertainty given the DOP of the area. A level of uncertainty (LOU) is selected as shown in Block 401. This level of uncertainty may be a function of the level of service, may be selected by the network operator or selected by a user. The level of uncertainly may also be set by standard, such as 95%, 67% or other. Using signal strength, geography and other known parameters as noted previously, a group or set of radio transmitters may be identified based on the capability that their signals can be received in the serving area as shown in Block 403.

Using the set of radio transmitters, a metric is determined across the area as shown in Block 405. The metric advantageously is reflective of the geometry of the radio transmitters with respect to each randomly distributed point across the area. This metric may be DOP, a function of DOP or another measurement of predicted uncertainty. From this metric along with the selected level of uncertainty, a number of measurements required at locations within the area can be determined as shown in Block 407. One method in which the number of measurements can be determined includes determining a measurement error standard deviation required based at least on the metric and the level of uncertainty; and determining the number of measurements required to obtain that measurement error standard deviation based on a plurality of measurements obtained in the serving area, at or near the location. These pluralities of measurements may be historical or simulated measurements.

In one example the metric may be determined by calculating a dilution of precision (DOP) for each of the plurality of randomly distributed points based on the geometry of each of the selected radio transmitters with respect to each of the random points, and, then modeling a DOP function of the area as a function of the calculated DOP for each of the plurality of points and using the DOP function as the metric.

Figure 5:
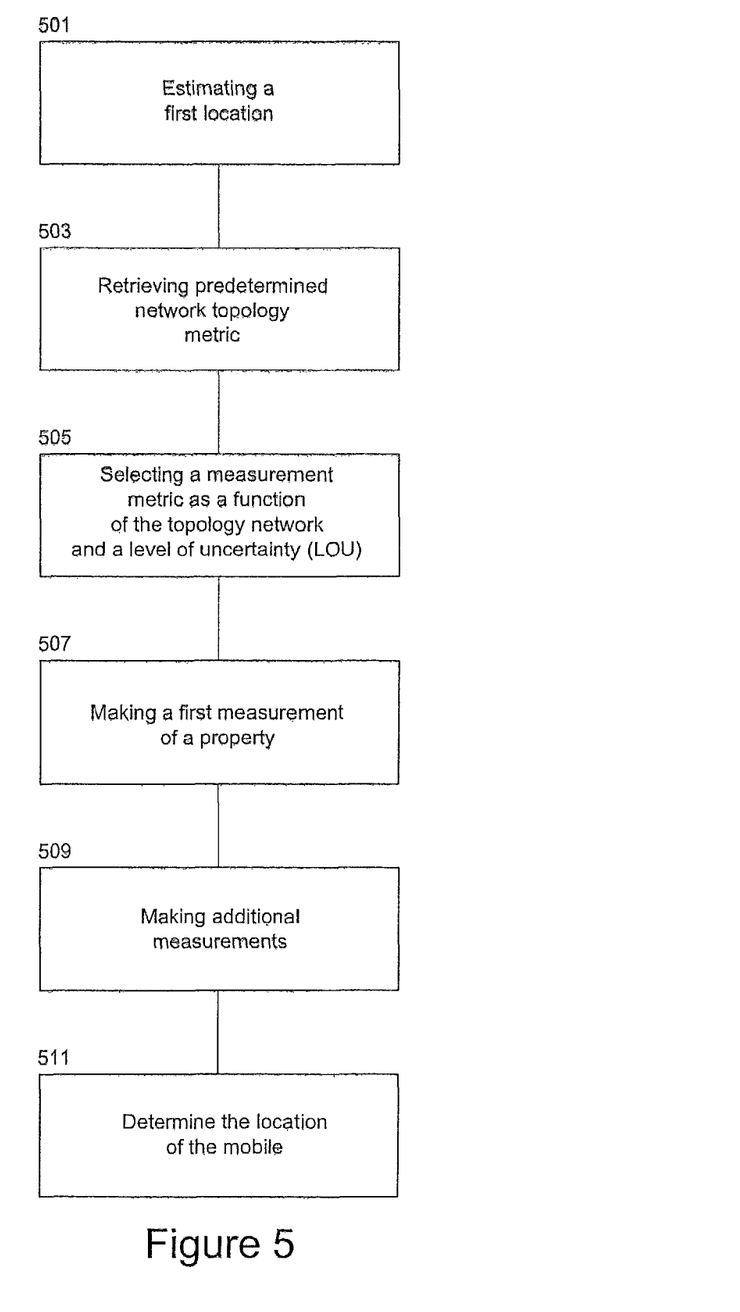
FIG. 5 is a flow chart of an additional embodiment of the present subject matter.

FIG. 5 is a representative flow chart illustrating an embodiment of a method 500 for determining the location of a mobile device. A first location is estimated as shown in Block 501, the estimation of the first location may be simple such as that of the serving base station, serving sector or more complex such as a function of the signal strengths of received radio transmitters or the radio transmitters received. Based on the first location, a predetermined network topology metric which is based on neighboring base stations (radio transmitter) associated with a the first location is retrieved as shown in Block 503. For example the neighboring base stations that are typically received in the first location are used in the determination of the network topology metric. The predetermined network topology metric for example may be DOP or other predicted uncertainly parameter and may be determined prior to estimating the first location.

Using the predetermined metric and a predetermined location uncertainty level, a measurement metric may be selected as shown in Block 505. As noted earlier the level of uncertainty may be a function of service level, network capability, user selected or from an operating standard. The measurement metric may be a measurement error standard deviation or other qualitative parameter reflective of distribution of the property measurements.

A first measurement is made the property as shown in Block 507, the property may be from one of many known parameters, such as signal strength, Return Trip Time (RTT), Return Trip Delay (RTD), Timing Advance (TA), Time of Arrival (TOA), Time Difference of Arrival (TDOA), Angle of Arrival (AoA), watermarks, phase, or frequency. Additional measurements of the same property are also made predicated on the measurement metric as shown in Block 509. For example the measurement metric may require three readings of the property in which case two additional measurements are made. For a property such as TOA where multi path, timing drift and other destabilizing phenomena may occur, additional readings may be required for the given measurement metric. A location of the mobile device based on the obtained measurements, including the first and additional measurements of the property may then be determined as shown in Block 511. A statistical measurement of the property based on the obtained measurements may be created, for example a mean, median, mode of the measured TOAs may be used in determining the location rather than each of the property measurements.

The measurement metric may be reflective of a mean deviation and a given number of measurements of a property typically result in the mean deviation. However, if the distribution of the property measurements changes significantly the association between the measurement metric and the number of measurements may become invalid. To account for such a disassociated a second measurement metric based on the first measurement and the additional measurements may be determined. This second measurement metric is a statistical measure of the distribution of the actual measurements obtained. The second measurement metric may be compared to the measurement metric and if the comparison reveals a detrimental disassociation further measurements may be requested to obtain the desired result originally dictated though the measurement metric A less mathematically rigorous approach to optimizing the number of measurements required may be obtained with a solution implementing adaptive tuning.

Rather than rely purely on simulation to determine the appropriate number of measurements to take, this method uses the results of location queries to tune the value. This process does not rely on DOP, just empirical observations, and has the additional advantage of being blind to the actual network topology. This approach also by its own nature automatically takes into account network changes whether known or unknown.

As requests arrive, a current measurement value associated with the serving area or location is used to determine the number of measurements to take; however, the resulting uncertainty is mapped against the number of measurements required to determine that value. If additional measurements are required to achieve the target uncertainty in the result, this is recorded.

To determine the impact of fewer measurements, measurements can be removed from the set of measurements and a calculation performed. This provides data for numbers of measurements that are lower than what are actually acquired. This might be performed if the resulting uncertainty significantly exceeds the desired value.

This means that information on the probability of a target uncertainty being achieved can be recorded against the number of measurements. Based on this information and a desired first-pass success probability threshold, the number of measurements that are initially sought can be tuned over time.

This method may be applied to generate an optimum number of measurements based on a small set of target uncertainty values (e.g. 100 m, 200 m or 500 m), or to produce a continuous graph based on a curve fit algorithm.

This method might use the output of a Monte Carlo simulation as described previously as a starting value; however, a fixed starting value would be equally sufficient as long as a divergence is protected against (e.g. local min, max).

Another advantage of this method is that it produces a result that is based on queries and therefore produces a result that is tuned to the pattern of queries that actually occur. A simulation has no ability to model the actual distribution of requests and to account for sources of variation that are not accurately modeled. Because this method is based on actual measurements, the results are tuned to the actual situation more accurately.

This option imposes an impact at runtime; it also requires additional data storage in order to maintain a representation of the evolving probability distribution. Data storage requirements increase as the tuning is applied over longer time periods or to allow for better accuracy.

The runtime impact of this solution may be reduced by performing any analysis and additional computation using computing resources that are separate to the request processing resources. The necessary data can be stored during normal request processing and processed independently. The results of processing may be provided to the request processing engine as they become available.

This approach also may benefit from knowledge of network topology, but does not require that it be known ahead of time.

Figure 6:
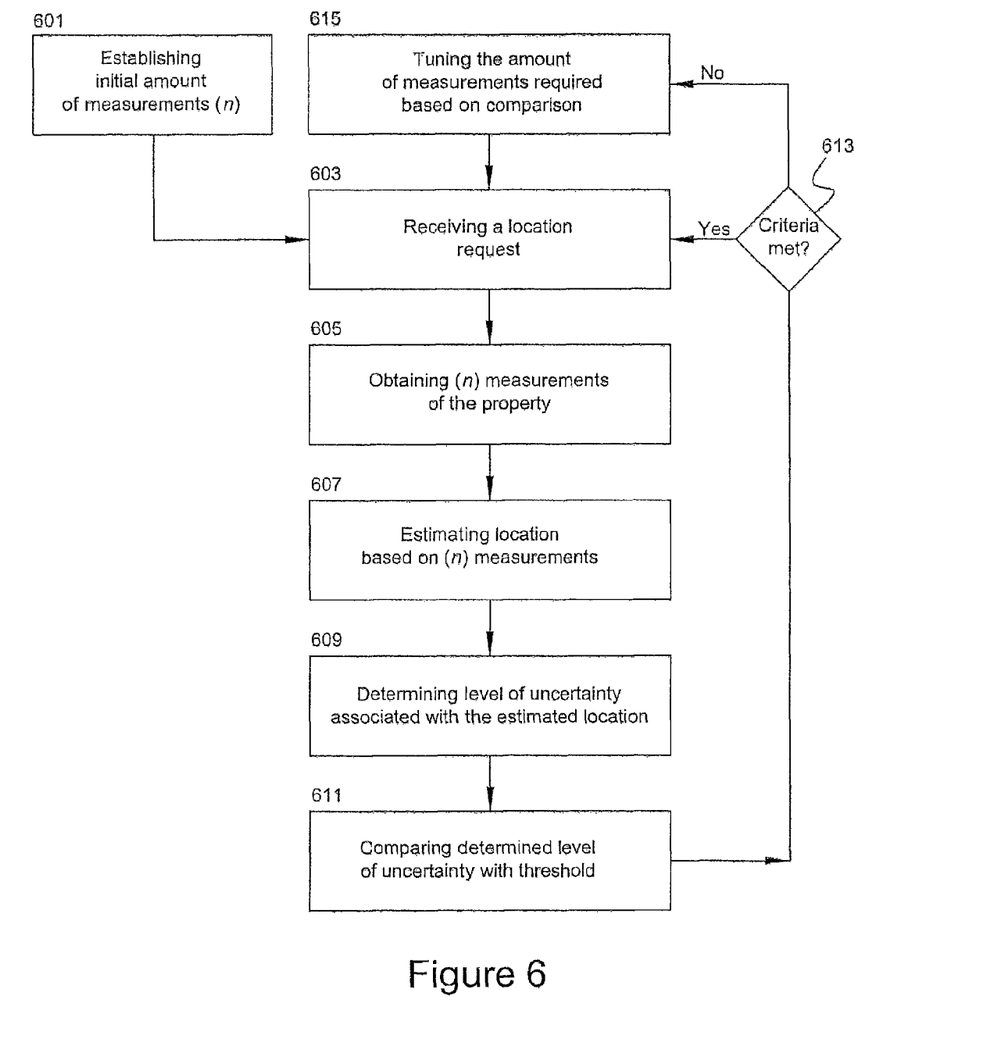
FIG. 6 is a flow chart of an embodiment of the present subject matter utilizing an adaptive approach.

An embodiment for adaptively optimizing the amount of measurements of a property required is represented in FIG. 6. The adaptive optimization is effective to achieve a desired level of uncertainty in a service area. An initial amount of measurement required of a property is first established as shown in Block 601. This amount can be determined through a simulation, historical data or preset a nominal starting point. The more accurate the starting value results in a quicker convergence and minimizes disparate local peaks and possible divergences. Upon receiving a location request, Block 603, the initial number (n) measurements of the property are obtained Block 605 and a location estimate is made using the n measurements Block 607. In addition to replying to the mobile device with the location estimate, the location estimate is evaluated to determine its level of uncertainty Block 609. This level of uncertainty is then compared with a threshold Block 611. The threshold may be based upon a desired level of uncertainty. For example if the desired level of uncertainty is at 90% confidence the threshold may within 5% of 90% (between 85% to 95%) or the threshold may directly correspond to the desired level or an acceptable level.

If the level of uncertainty is less then, greater than or outside the threshold as determined in Block 613, the amount of measurements n of the property is adaptively tuned as shown in Block 615. For example if the LOU was greater than a threshold the amount of measurements would be increased, if the LOU was less than the threshold, the amount of measurements may be decreased. The amount of measurements may be tuned with respect to each specific property, such that each property has an associated amount of measurements. The level of uncertainty has an inverse relationship with the confidence level. A high level of uncertainty means a low confidence level and a low level of uncertainty has a high level of confidence. The level of uncertainty may be measured by confidence level.

The calculated may advantageously be filtered prior to the comparison such that individual outliers do not adversely affect the tuning. Such filtering could include integration, weighting, damping, low pass filtering, truncating, or running average or other known smoothing method.

Figure 7:
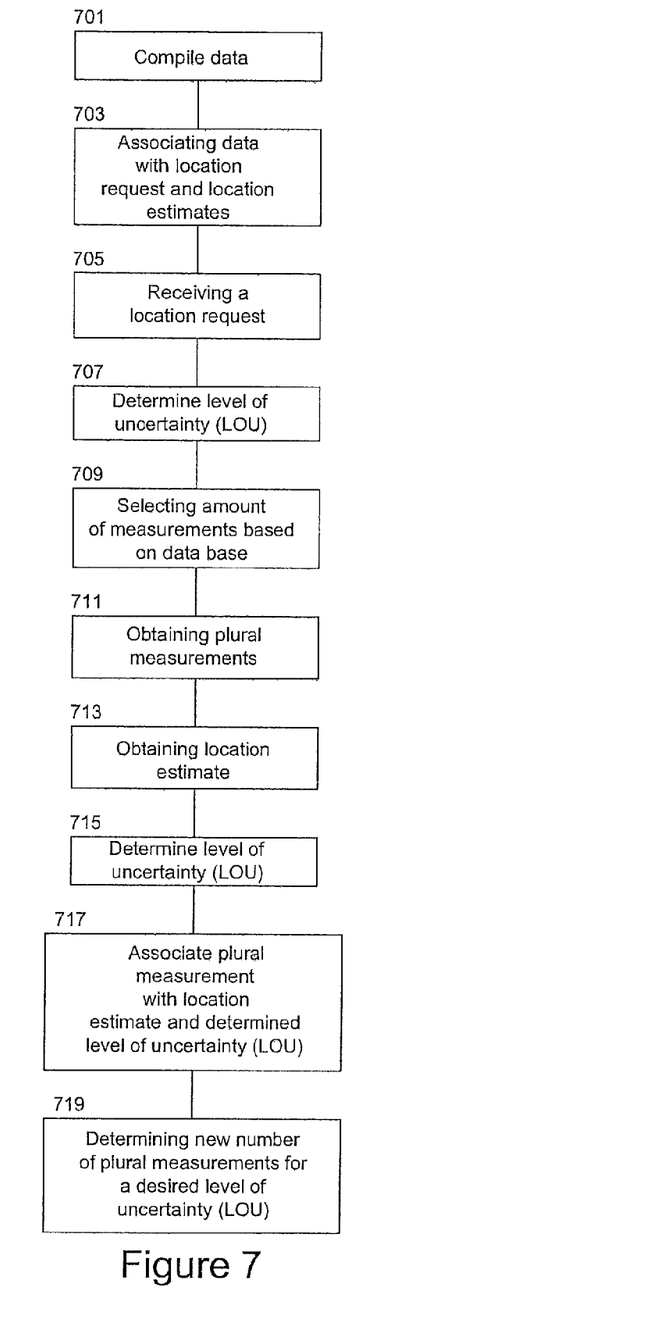
FIG. 7 is a flow chart of another embodiment of the present subject matter utilizing an adaptive approach.

FIG. 7 is a representative flow chart for locating a mobile within a predetermined level of uncertainty where the number of measurements is determined using a historical data base.

In one embodiment data including location estimates that is associated with past location requests within a service area is compiled in a database as shown in Block 701. Within the database, the amount of property measurements and the related level of uncertainty of the location estimate are associated, Block 703. Upon receiving a location request, Block 705, the level of uncertainty required is determined as shown in Block 707. The level of uncertainty required as noted previously may be selectable or be a function of service level or performance. The amount of measurements required for a property is then selected using the database based on the level of uncertainty and an index as shown in Block 709.

The measurements of the property are obtained in the amount selected, Block 711 and a location estimate is determined using the property measurements or a statistical representation of the measurements as shown in Block 713. The level of uncertainty of the location estimate is determined in Block 715 and associated with the plural measurements obtained and the location estimate, as shown in Block 717. The database is updated with the new information, including determined level of uncertainty, amount of measurements and location, and an updated number of measurements may be determined as shown in Block 719. Upon receipt of a new location request, the database will have been updated. Based on the desired level of uncertainty and the associated data in the database, the amount of measurements required may be increased or decreased.

Figure 8:
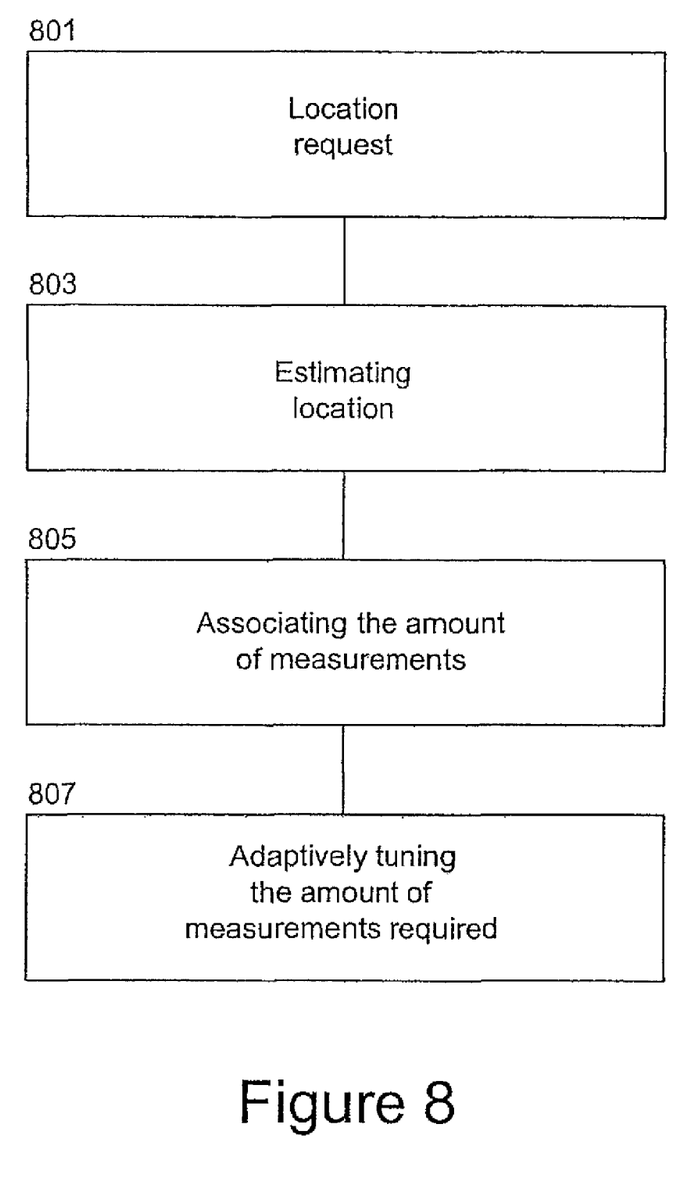
FIG. 8 is flow chart of an additional embodiment of the present subject matter utilizing an adaptive approach.

FIG. 8 is a representative flow chart for determining a nominal amount of plural measurement required to obtain a predetermined level of uncertainty using location request. Such methods are advantageous in service areas that experience property fluctuations. Upon receiving a location request, Block 801, a location is estimated with a predetermined level of uncertainty and using a nominal amount of property measurements (property samples) as shown in Block 803. In a database, the amount of measurement samples of a property taken, the estimated location and the resulting level of uncertainty calculated from the estimated location using the measurement samples are associated as shown in Block 805; and the associated nominal amount of property measurements is adaptively tuned based on the estimated location and its level of uncertainty as shown in Block 807.

Figure 9:
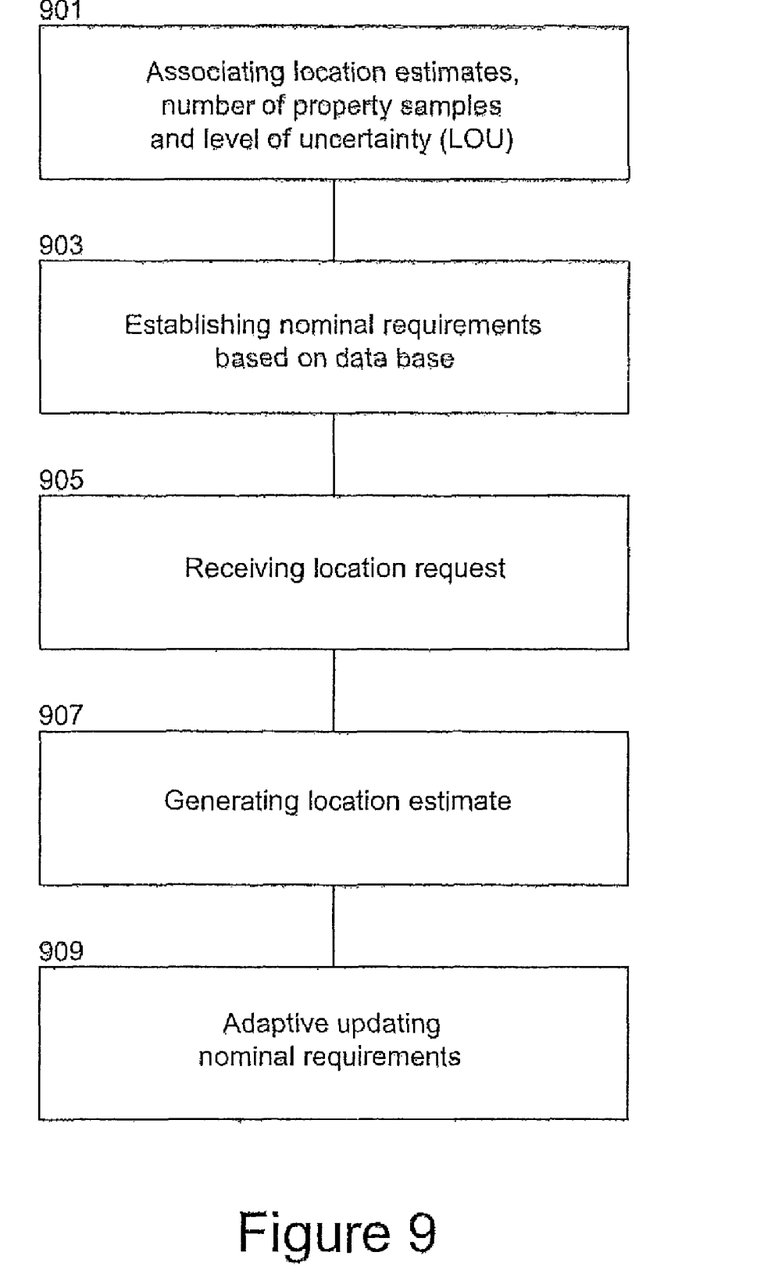
FIG. 9 is a flow chart of a further embodiment of the present subject matter utilizing an adaptive approach.

FIG. 9 is a representative flow chart for a method of optimizing the nominal requirements associated with a wireless communications property. Location estimates along with the number of property samples used to determine the location estimate and the level of uncertainty associated with the location estimate are associated and stored in an historical database as shown in Block 901. The radio transmitters involved with the location estimate as well as other network and environmental parameters may also be associated and stored in the historical database. Using the information and associations in the historical location database, the nominal amount of measurements required is established as shown in Block 903. The nominal requirements may include at least the number of measurement requested for each wireless communication property used to estimate the location. Upon receiving a location request, Block 905, a location estimate is generated, Block 907, according to the nominal requirements established from the historical database and the nominal requirements established may be adaptively updated as shown in Block 909. After determining the level of uncertainty for the location estimate, it may be compared to a threshold and based on the comparison the nominal requirements may be increased or decreased. The adaptive optimization may also be based on other attributes of the location estimate, such as duration, time, and resource availability. The location estimate, it associated number of property samples and its determined level of uncertainty are also stored and associated in the database.

As described above measurement acquisition for iterative methods of location determination may be optimized to improve performance and responsiveness.

The disclosed subject matter relates to any location determination technology in a wireless network that uses measurements from multiple radio transmitters, including but not limited to OTDOA (UMTS, LTE, WiMAX), U-TDOA (GSM, UMTS, LTE), RTT (UMTS, WiMAX), TA (GSM, LTE), Signal strength (any wireless network).

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal thereof.

What we claim is:

1. A method of adaptively optimizing the amount of measurements of a property required to achieve a desired level of uncertainty in a service area, the method comprising:
    establishing an initial amount (n) of measurements required of a property;
    receiving a location request;
    obtaining n measurements of the property;
    estimating a location associated with the location request based on at least the n measurements of the property;
    determining the level of uncertainty associated with the estimated location;
    comparing the determined level of uncertainty with at least one threshold, wherein the threshold is based on the desired level of uncertainty; and
    tuning the amount of measurements n required of the property based upon the comparison.

2. The method of claim 1, further comprising reporting the location to the sender of the location request.

3. The method of claim 1, comprising:
    establishing an initial amount ($n_i$) of measurements required for each of a plurality of properties (i);
    obtaining $n_i$ measurements for each of the i properties; and,
    estimating the location based on at least the $n_i$ measurements; and,
    tuning the amount of measurements $n_i$ required for at least one of the plurality of properties based on at least the comparison;
    wherein $n_i$ is the amount of measurements for the $i^{th}$ property of the plurality of properties.

4. The method of claim 1, comprising filtering the level of uncertainty in the time domain.

5. The method of claim 1, comprising: integrating successive levels of uncertainty to obtain the determined level of uncertainty.

6. The method of claim 1, comprising:
    low pass filtering successive levels of uncertainty to obtain the determined level of uncertainty.

7. The method of claim 1, comprising: obtaining a running average of the successive levels of uncertainty to obtain the determined level of uncertainty.

8. The method of claim 1 wherein the initial amount of measurements is determined as a result of a Monte Carlo simulation.

9. The method of claim 1, comprising: increasing the number of measurements if the determined level of uncertainty is below the at least one threshold.

10. The method of claim 1, comprising: decreasing the number of measurements if the determined level of uncertainty is above the at least one threshold.

11. The method of claim 1, wherein the initial amount of measurements is set by the network.

12. The method of claim 1, wherein the property is selected from the group consisting of signal strength, Return Trip Time (RTT), Return Trip Delay (RTD), Timing Advance (TA), Time of Arrival (TOA), Time Difference of Arrival (TDOA) and Angle of Arrival (AoA).

13. The method of claim 1, wherein the i properties are selected from the group consisting of signal strength, Return Trip Time (RTT), Return Trip Delay (RTD), Timing Advance (TA), Time of Arrival (TOA), Time Difference of Arrival (TDOA) and Angle of Arrival (AoA).

14. The method of claim 1, wherein the threshold is a percentage of the desired level of uncertainty.

15. In a service area subject to property fluctuations, a method of determining a nominal amount of plural measurements of a property required to obtain a predetermined level of uncertainty using actual location requests, the method comprising: receiving a location request, estimating a location based on an predetermined level of uncertainty and an amount of property measurements used; associating the amount of measurement samples of a property taken, the estimated location and the resulting level of uncertainty calculated from the estimated location using the measurement samples; and adaptively tuning the associated nominal amount of property measurements based on the estimated location and its level of uncertainty.

16. The method of claim 15, wherein the property is selected from the group consisting of signal strength, Return Trip Time (RTT), Return Trip Delay (RTD), Timing Advance (TA), Time of Arrival (TOA), Time Difference of Arrival (TDOA) and Angle of Arrival (AoA).

* * * * *